United States Patent Office 3,253,883
Patented May 31, 1966

3,253,883
METHOD OF TREATING EXHAUST GASES OF INTERNAL COMBUSTION ENGINES
Joseph Jaffe, Berkeley, Calif., assignor to Monsanto Company, a corporation of Delaware
No Drawing. Filed Jan. 26, 1965, Ser. No. 428,246
9 Claims. (Cl. 23—2)

This is a continuation-in-part of my application Serial No. 114,664 filed June 5, 1961, now abandoned, and the disclosure of the present application should be considered in conjunction with the disclosure of said application Serial No. 114,664 and considered to be a continuation-in-part thereof.

The present invention relates to the catalytic oxidation of combustible or oxidizable gases and vapors. The present invention more particularly relates to the use of novel, physically stable catalysts in exhaust systems of internal combustion engines to aid in preventing or minimizing the discharge of carbon monoxide and non-combusted or partially combusted products to the atmosphere. The present invention still further relates to processes for the partial or substantially complete removal of smog-forming materials from the exhaust gases of internal combustion engines.

It is well-known that when fuels burn in an automotive engine, such as an ordinary gasoline or diesel engine, combustion is relatively incomplete and a considerable portion of the fuel is discharged into the atmosphere in an unburned or partially oxidized condition and constitutes a part of the mixture of exhaust gases formed by the operation of such automotive engines. The exhaust gases from such internal combustion engines contain a mixture of toxic agents such as carbon monoxide and other undesirable oxidizable materials such as hydrocarbons, both saturated and unsaturated, and oxygenated organic compounds, such as aldehydes and organic acids, which are present due to the aforementioned, relatively incomplete, combustion of the fuels. Recently, due in part to the increasing use of automobiles and the resulting increase in automobile traffic, air pollution from such exhaust gases, particularly in urban areas, has been aggravated. It has further become apparent that even relatively small concentrations of oxidizable hydrocarbons and oxygenated organic compounds in automobile exhaust gases are serious and significant contributors to the problem of smog-formation in certain cities and air polution in urban areas in general.

The term "exhaust gases" as used herein is intended to mean the gas streams produced by the fuels burned in and during the operation of internal combustion engines such as diesel engines or the gasoline engines of automobiles and which gases contain the aforedescribed mixture of carbon monoxide and oxidizable materials.

The term "start up exhaust gases" as used herein is understood to mean the exhaust gases initially produced by internal combustion engines, when the exhaust gases from such engines are at relatively low temperatures of from 250° C. to 350° C. Such gases contain relatively large quantities of vapors of uncombusted or partially combusted fuels, representing as much as 50% of the fuel supplied to the engine.

The term "deceleration exhaust gases" as used herein is understood to mean the exhaust gases produced by internal combustion engines during conditions of deceleration or when such engines are idling. Such gases also contain appreciable quantities of vapors of uncombusted or partially combusted fuels, the quantities being of the same order of magnitude as those present in start up exhaust gases. The amount of vapors of uncombusted or partially combusted oxidizable materials in exhaust gases varies considerably, but such gases usually contain from 2% to 3% by volume of carbon monoxide and from 0.1% to 0.3% of a mixture of vapors of saturated and unsaturated hydrocarbons and oxygenated organic compounds, generally aldehydes, and organic acids. The amount of such materials in exhaust gases will depend upon the particular internal combustion engine employed and the conditions under which it is operated.

Internal combustion engines usually run "rich," that is with air-fuel ratios too low for complete combustion of fuel under normal operating conditions. Thus, for example, during the normal cruising conditions of an automobile, approximately 1% to 4% of the fuel supplied to the engine is discharged in the exhaust gases as unburned or partially combusted material in the form of the aforedescribed mixture. This amount increases from about 2% to 8% while the engine is idling and may be as large as 50% during start-up or under deceleration conditions.

One of the principal reasons for the large quantity of uncombusted and partially combusted fuel in exhaust gases during start-up conditions is the low temperature inside the engine and it is well-known that at the higher temperatures, e.g., temperatures above 350° C., which prevail after the engine has warmed up, there results some decrease in the aforementioned uncombusted and partially combusted fuel products in the exhaust gases. However, even at such higher temperatures, usually not enough oxygen or air is present in the exhaust gases to effect complete oxidation or combustion of the aforementioned products.

It has been proposed heretofore to purify or eliminate the noxious or troublesome constituents of the aforementioned exhaust gases through the use of certain oxidation catalysts. Such catalysts have usually been placed in the exhaust line or pipe of internal combustion engines to contact a mixture of air and the exhaust gases of the engines for the purpose of removing the objectionable constituents in the exhaust gases. It has also been proposed heretofore to use certain specific oxidation catalysts in specially designed mufflers so that air would be mixed with the exhaust gases immediately prior to contacting such gases with the catalyst, the purpose of the air being to provide oxygen for the catalytic oxidation. One such typical "catalytic muffler" has been described in U.S. Patent No. 2,909,415, to Eugene Joules Houdry, issued October 20, 1959. Unfortunately, the difficulty of providing a physically stable, sufficiently active oxidation catalyst, which is operable under the wide variations in temperature and concentration of oxidizable materials usually found in the aforementioned exhaust gases, has thus far prevented the adoption and use of oxidation catalysts and/or mufflers containing such catalysts on any significant scale.

Generally speaking, the oxidation catalysts heretofore disclosed for the foregoing purposes do not function or do not function efficiently at temperatures below 450° C. and such catalysts are generally ineffective to catalyze oxidation when contacted with start-up exhaust gases containing air at temperatures of from 250° C. to 350° C. which prevail during start-up conditions. The addition of air to the exhaust gases although necessary to provide oxygen for catalytic oxidation of the exhaust gases, also usually lower the temperature of exhaust gases below 450° C.

Another factor which has generally prevented the production of an acceptable oxidation catalyst for use in a catalytic muffler is that of the arrangement of the catalyst in such a manner that a minimum of back pressure is imposed upon the internal combustion engine while at the same time maintaining uniform and efficient contact between the exhaust gases and the surface of the catalyst. Generally, in catalytic mufflers, a bed of granules such as cubes, spheres or irregularly shaped tablets composed of catalytic material is disposed at random in a container in the muffler through which the exhaust gases pass. When employing the catalyst in such a manner, that is, as a bed of catalyst pellets in a catalytic muffler, considerable difficulty is encountered in maintaining a low pressure drop through the catalyst bed (and therefore low back-pressure on the engine) while at the same time maintaining uniform and efficient contact between the exhaust gases and the catalyst bed under all of the great variety of operating conditions which accompany the use of a catalytic muffler in a road vehicle. Such catalyst bed is subjected to constant vibration, tilting, shocks and jars due to the vibration of the engine and the passage of the vehicle over the roads. The volume and temperature of the exhaust gases entering the catalyst bed undergoes constant variations as indicated herein, depending upon the speed of the engine and load conditions, which cause the catalyst to undergo constant and continual temperature variation accompanied by continual thermal expansion and contraction. The granules, pellets, or tablets of the catalyst bed are also constantly subjected to the introduction of foreign solid particles emanating from the engine itself or in the road dust present in the air which is introduced into the muffler.

Under such combination of rigorous conditions, coupled with the necessity for maintaining low back-pressure and a uniform and effective contact between the exhaust gases and the catalyst, the physical stability of the catalyst particles in the catalyst bed becomes critical. Because of the constant and often violent movement to which the catalyst housing is subjected, the catalytic particles must be confined on all sides to prevent their escape from the muffler and to maintain a bed of substantially constant shape and dimensions. Under these conditions, the pellets and granules of oxidation catalysts heretofore described in the literature usually disintegrate to a powder, which prevents efficient contact between the catalyst and the exhaust gases, and often blocks the passage of gases through the muffler resulting in the catalytic material being "blown-out" of the muffler.

In accordance with the present invention it has been found possible to obtain a novel, efficient, physically stable, porous catalyst which will resist the physical attrition caused by conditions normally encountered in catalytic mufflers, which will not pulverize or disintegrate for practical periods of time and which will oxidize and remove a substantial amount of the undesirable oxidizable constituents in exhaust gas streams even at low temperatures or under start-up conditions.

It is an object of the present invention to provide for the use of novel and efficient oxidation catalysts which oxidize hydrocarbons and/or oxygenated organic compounds at relatively low temperatures in the catalytic oxidation of toxic gases and vapors in exhaust gases from internal combustion engines.

It is also an object of this invention to provide novel and efficient methods for the removal of toxic and objectionable constituents from the exhaust gases of internal combustion engines.

Still further objects and advantages of the present invention will become apparent from the following description and the appended claims.

The present invention provides for novel and efficient methods of removing toxic and objectionable constituents from the exhaust gases of internal combustion engines by use of a novel, solid catalyst consisting essentially of a catalytically active mixture of metal oxides in the following proportions:

$$(CuO)_a \cdot (MO)_{1-a} \cdot Cr_2O_3 \cdot XM'O_2$$

where M is a divalent transitional metal selected from the group consisting of cobalt and iron, M' is a tetravalent transitional metal selected from the group consisting of zirconium, hafnium and mixtures thereof, $a$ is a fractional number of from about 0.1 to 0.9 and X is a number of from about 1 to 8. Such catalysts are preferably solid, porous attrition resistant inorganic complexes of the aforedefined metal oxides and also preferably have certain other physical properties as hereinafter described.

By the term "inorganic complex" as used herein is meant a mixture of the aforementioned metal oxides wherein the oxides are chemically or physically bonded together and cannot readily be separated by conventional means to obtain a single metal oxide component in pure form. For example, under microscopic examination the inorganic complex will appear as an entity and homogenous as distinguished from a physical admixture of the aforementioned metal oxides in which each of the components will appear as separate and distinct entities.

A particularly preferred catalyst for use in the present invention is a solid porous catalyst comprising granules of an amorphous, catalytically active inorganic complex having the formula:

$$(CuO)_c \cdot (M_1O)_{1-c} \cdot Cr_2O_3 \cdot XM'O_2$$

where $M_1$ is a cobalt, iron, or mixtures thereof and M' is a metal selected from the group consisting of zirconium, hafnium and mixtures thereof and is preferably a mixture of zirconium and hafnium having a Zr:Hf ratio of from 8:1 to 12:1, $c$ is a fractional number of from about 0.25 to 0.75 and X is a number of from 1 to 8 preferably a number of from 2 to 6.

A particularly preferred catalyst for use in the processes of the present invention is a solid porous catalyst comprising granules of an amorphous, catalytically active inorganic complex having the formula:

$$(CuO)_{0.25} \cdot (CoO)_{0.75} \cdot Cr_2O_3 \cdot XM'O_2$$

wherein M' is selected from the group consisting of zirconium, hafnium or mixtures thereof, and is preferably a mixture of zirconium and hafnium wherein the Zr:Hf ratio is a ratio of at least 10:1, preferably from 10:1 to 12:1, and X is a number of from 2 to 6, preferably 3. Catalysts having the aforementioned formula of this paragraph but wherein FeO is substituted for CoO, are also preferred for use in the processes of this invention.

Generally speaking, the catalysts useful in this invention comprise mixtures of the hereinbefore defined metal oxides which may be in the form of finely divided particles but preferably are in the form of three dimensional granules larger than such particles and having various regular or irregular geometrical shapes such as, for example, spheres, cubes, cylinders, paralleloids; tablets having rectangular surfaces, elliptically shaped pellets, and irregularly shaped particulates. The size and dimensions of such geometrical shapes of granules may vary to a considerable extent, depending upon the environment in which a particular catalyst is used, but a given geometrical shape preferably has a length, width, height or diameter which varies from between 1/16 and 1/4 inch in any of these dimensions.

The solid catalysts may vary widely with respect to density, pore volume and specific surface area but are generally characterized in having a bulk density in the range of from 1.5 to 3.0 grams per cubic milliliter, a pore volume of from about 0.1 to about 0.4 milliliters per gram and a specific surface area of from about 40 to about 200 square meters per gram. The preferred catalysts as hereinbefore described preferably have a bulk density of from about 2.0 to about 2.5 grams per cubic milliliter, a pore volume in the range of from about 0.2 to about 0.4 milliliter and a specific surface area of from about 60 to about 120 square meters per gram.

The bulk densities of the catalysts of this invention may be determined by classical methods, e.g., by weighing a known volume of a particular catalyst. The measurements of pore volumes of various materials is discussed in detail by C. L. Drake and H. L. Ritter in "Industrial and Engineering Chemistry," Analytical Edition, volume 17, pages 782–791 (1945). The methods described therein were essentially those used in determining the pore volumes of the catalytically active inorganic complexes comprising the catalysts of this invention. Specific surface area determinations may be carried out by the method of Brunnauer, Emmet and Teller, described in "Advances in Colloid Science," volume 1, pages 1–36 (1932), published by Interscience Publishers Inc., New York, N.Y.

The catalysts useful in the present invention may generally be prepared by a process which comprises heating a mixture of metal oxides usually comprising $CuO$, $Cr_2O_3$, a divalent transitional metal such as cobaltous oxide or ferrous oxide and a transitional metal oxide selected from the group consisting of zirconium oxide, hafnium oxide and mixtures thereof, at a temperature sufficient to form a catalytically active material. Such catalysts are usually prepared by mixing the hereinbefore defined metal oxides when in a finely divided state. The amount of each metal oxide mixed will vary, depending upon the properties desired in the particular catalyst, but is preferably an amount sufficient to provide a metal oxide mixture having a $CuO:MO:Cr_2O_3:M'O_2$ mol ratio of from 0.1 to 0.9 mol of $CuO$, from 0.1 to 0.9 mol of $MO$, about 1 mol of $Cr_2O_3$ and from about 1 to 8 mols of $M'O_2$ where M is cobalt or iron and M' is zirconium, hafnium or mixtures thereof.

The particle size of the particles of each of the finely divided metal oxides used to prepare the catalysts may vary to some extent but is preferably a particle size in the range of from about 0.5 to 15.0 microns and is preferably a range of from 0.5 to 5.0 microns and the particles of the mixture of finely divided metal oxides usually have a particle size within such ranges.

In preparing the catalysts of the present invention it has been found particularly desirable to heat or calcine a metal oxide mixture, such as described above, in the presence of from 1% to 3% by weight of water. Stated differently a metal oxide mixture to be heated or calcined will preferably contain from 1% to 3% by weight of water.

The mixture of metal oxides are generally heated or calcined at a temperature in the range of from 600° F. to 1200° F. until the hereinbefore defined inorganic complex is formed. The exact heating time will vary within the above range depending upon the quantity of metal oxide and the heating temperature employed but is usually in the range of from one to four hours, or until an inorganic complex having the hereinbefore defined physical properties is formed. Generally speaking, longer heating times are required when lower temperatures, e.g., from 600° F. to 900° F. are employed, and shorter times are required when temperatures in the range of 900° F. to 1200° F. are employed. By so proceeding the metal oxide mixture agglomerates to form a single, solid porous block of catalyst.

It has also been found generally desirable to heat or calcine a mixture of metal oxides which contain from 0.5% to 10% by weight of a finely divided thermally decomposable binding material such as, for example, graphite, tragacanth, acacia or the like. The heating or calcining of such mixtures produces attrition resistant catalysts having somewhat more uniform pore volumes and specific surface areas within the ranges as hereinbefore defined than are obtainable when such binding materials are not used. The incorporation of a binding material in the metal oxide mixture is particularly useful, due to the adhesive properties thereof which aid in binding the metal oxide particles together, when it is desired to obtain the catalysts in the form of the geometrical configurations or shapes hereinbefore described, although such shapes may often be obtained without such binding materials.

The catalysts useful in this invention are preferably prepared in various shapes such as spheres, cubes, paralleloids, cylinders, irregularly shaped particulates and the like by forming the metal oxide mixtures into the particular shape prior to heating or calcining as heretofore described. Such shapes may be prepared by methods well-known to those skilled in the art such as, for example, by molding, compression or the like. However, it may also be possible to obtain rectangular shapes or irregular granular shapes by cutting or grinding a solid porous block of the catalyst obtained as above described.

It has been found particularly preferable, however, to obtain the catalyst in various shapes or granules by molding or shaping a metal oxide mixture containing from 0.5% to 10% by weight, preferably 0.5 to 2.0%, of a thermally decomposable binding material commonly used in the tableting and pelleting art. Such binding material when incorporated in the metal oxide mixture binds the metal oxide particles together and enables the metal oxides to be formed in shapes which will not break prior to or during the heating or calcining operation. Although any suitable thermally decomposable binding material may be employed, binding materials such as graphite, starch, acacia and tragacanth are preferred and graphite is particularly preferred.

Catalysts thus prepared, and having the above-described configurations, are characterized in having an excellent physical stability and attrition resistance, that is to say they will not usually powder or lose their shapes when exposed to temperatures between 250° C. and 900° C. or when subjected to mechanical movement or jarring or other forces which normally cause attrition of solid granules.

The catalysts useful in this invention are preferably prepared by adding the hereinbefore defined finely divided metal oxides to an aqueous medium, preferably water, to form an aqueous dispersion or slurry comprising a mixture of the metal oxides, composed of particles having a particle size as above-described, which are dispersed in the aqueous medium. The metal oxide mixture so produced may then be dried and heated as described below. The amount of the metal oxide mixture in the slurry may vary considerably but generally will be in the range of from 15% to 60% by weight of such slurry. The amount of metal oxides in the metal oxide mixture may also vary to some extent but such mixture preferably contains, based on the weight of the slurry, from 1% to 5% by weight of $CuO$, from 1% to 5% by weight of the divalent transitional metal oxide such as cobaltous oxide or ferrous oxide, the total amount of $CuO$ and either cobaltous oxide or ferrous oxide being not more than 6% by weight; from 5% to 15% by weight of $Cr_2O_3$ and from 5% to 45% by weight of $ZrO_2$, $HfO_2$ or mixtures thereof, the balance consisting essentially of water.

The resulting slurry may then be dried to constant weight to form a dry appearing metal oxide mixture containing from 1% to 3% by weight of water. Alternatively and preferably the metal oxide mixture may be separated from the bulk of the aqueous phase of the slurry by any well-known means such as filtration, sedimentation and the like prior to drying. The metal oxide mixture in the form of a slurry or separated solids may then be dried at elevated temperatures, usually a temperature in the range of from 200° F. to 325° F., although temperatures of from 100° F. to 200° F. may also be employed. The dry appearing metal oxide mixture may then be processed by any one of the methods hereinbefore described and heated or calcined to produce the catalysts of this invention and which have the desirable properties herein described.

The catalysts useful in the present invention may be prepared by still another method which comprises drying a slurry comprised of a mixture of the hydroxides of hydrous oxides of the metals of the above-described metal oxides. Such a slurry may comprise a mixture of such metal hydroxides or may contain one or more of the aforementioned metal oxides instead of a particular metal hydroxide.

The above slurries are usually prepared by adding a water-soluble alkaline hydroxide to a solution containing a mixture of water-soluble salts of the metals or the metal oxides and a thermally decomposable anion such as, for example, nitrate or acetate salts of the above mentioned metals, to form an aqueous slurry comprising a mixture of the corresponding water insoluble metal hydroxides or hydrous oxides dispersed in an aqueous solution containing the water soluble salt of the thermally decomposable anion and the cation of the alkaline hydroxide. The particle size of the particles of the mixture of the metal hydroxides in such slurries is usually in the range of from 0.5 to 5.0 microns.

Although any water-soluble alkaline hydroxide may be employed, water-soluble hydroxides such as, for example, $NH_4OH$ and alkali metal hydroxides have been found particularly desirable. The amount of such hydroxide to be added to the solution will vary, depending upon the amount of water-soluble metal salts in the solution, but is an amount sufficient to convert all of the water-soluble metal salts to metal hydroxides or hydrous oxides in the slurry.

Although the above described slurry may be prepared in a variety of ways, it has been found particularly desirable to first prepare an aqueous solution containing from about 1% to 5% by weight of $Cu(NO_3)_2$, from about 1% to about 5% by weight of the divalent transitional metal nitrate such as $Co(NO_3)_2$ or $Fe(NO_3)_2$, the total amount of $Cu(NO_3)_2$ and either the $Co(NO_3)_2$ or $Fe(NO_3)_2$ salt usually not exceeding 6% by weight of the solution, from about 10% to about 30% by weight of $Cr(NO_3)_2$, and from about 10% to about 45% of mixture of finely divided $ZrO_2$ and/or $HfO_2$ to provide a slurry containing $ZrO_2$ and/or $HfO_2$ dispersed in an aqueous solution of the metal salts. To such slurry is then added a solution of $NH_4OH$, preferably of 20 to 28% by weight concentration, in an amount sufficient to convert all of the water-soluble metal salts to the hydroxide form. The aqueous slurry so formed usually contains a mixture of hydrous oxides having a particle size in the range of from 0.5 to 5.0 microns which mixtures can then be dried, hereinbefore described.

When it is desired to incorporate a thermally decomposable binding material such as, for example, graphite into any of the above-described mixtures of metal oxides or hydrous oxides, such material may be incorporated in the aqueous slurry containing the metal oxide mixture or it may be incorporated after such slurry has been dried as above-described, but prior to calcining.

The catalysts useful in the present invention may be generally used to effect the oxidation of the oxidizable constituents of a wide variety of gaseous mixtures from the exhaust of internal combustion engines by contacting such mixtures, together with air at a temperature in the range of from 250° C. to 950° C.

The catalystic oxidation of the hereinbefore mentioned undesirable elements in exhaust gases may be generally effected by placing a "bed" of the catalyst usually in the form of granules such as spheres, cubes, pellets, or tablets, directly in the exhaust pipe or muffler of the engine whereby the exhaust gases are contacted with the catalyst as the gases pass through the exhaust pipe or muffler. As stated heretofore, a variety of devices for holding or supporting oxidation catalysts in the exhaust lines of internal combustion engines have been previously described. Such devices have been variously designated as exhaust purifying apparatus or catalystic exhaust mufflers and usually consist of a housing, commonly an oval cylinder, which is capable of confining and supporting the catalyst bed. Such devices also usually contain means for introducing and mixing air with the exhaust gases prior to contact with the catalyst bed to provide the oxygen necessary for catalytic oxidation. The air is generally introduced into the exhaust device or muffler by means of an air pump or a venturi.

The catalyst useful in this invention may be placed in any such exhaust purifier or catalytic muffler. Such catalysts are preferably in granule form as hereinbefore described and preferably have certain dimensions as hereinafter defined in order that the resistance to the passage of the mixture of air and exhaust gases be held to a minimum and also to avoid back-pressure. The quantity of catalyst and therefore the size of the muffler may vary considerably, depending upon the size of the internal combustion engine and the amount and rate of exhaust gases produced. For example, a four-cylinder gasoline engine will require a smaller quantity of catalyst than a six or eight cylinder gasoline engine. The quantity of catalyst required will also depend upon the amount and rate of exhaust gases to be contacted therewith. Generally speaking, it has been found that one standard volume of the catalyst will catalytically oxidize from 15,000 to 45,000 standard volumes of exhaust gases per hour for periods ranging from 200 to 350 hours of engine operation. Stated differently, it is possible with the catalysts which are useful in the present invention, to catalytically oxidize from 90% to 100% of the hydrocarbon and oxygenated organic materials such as aldehydes, ketones and the like and more than 90% of the carbon monoxide present in the exhaust gases of internal combustion engines such as, for example, automobile engines, for from 8,000 to 15,000 miles of normal operation and in some instances for a larger number of miles.

In one embodiment of this invention it has been found desirable to contact a mixture of exhaust gases containing from 4% to 34% by volume of air and which also contains from 1% to 3% by volume of oxidizable hydrocarbons and oxygen-containing organic materials such as aldehydes and ketones and from between 1% to 3% by volume of carbon monoxide, with the catalyst at a temperature in the range of from 250° C. to 950° C. By such process it is possible to oxidize these oxidizable constituents of the exhaust gases to relatively innocuous materials.

The catalyst when used in the above-described manner may be in any form, e.g., a solid continuous form or in a granule form such as spheres, tablets, or pellets having a maximum and minimum dimension in the range of between $\frac{1}{16}$ and $\frac{1}{4}$ inch. When the catalyst is in cylindrical, tablet, or pellet form the diameter and thickness of the tablet or pellet is preferably within the range of $\frac{1}{16}$ to $\frac{1}{4}$ inch.

A further understanding of the catalyst and its method of use will be obtained from the following examples which are intended to illustrate the invention but not to limit the scope thereof; parts and percentages being by weight unless otherwise specified.

Example I

To a fourth gallon stainless steel tank equipped with a high speed electric motor and a nine-inch 4-bladed propeller for rapid agitation was added 71.63 kilograms of water; 1.21 kilograms $Cu(NO_3)_2 \cdot 3H_2O$; 4.37 kilograms $Co(NO_3)_2 \cdot 6H_2O$; 16.01 kilograms of $$Cr(NO_3)_2 \cdot 9H_2O$$

and; 36.97 kilograms of $Zr(NO_3)_4 \cdot 5H_2O$. The mixture was agitated at high speed until complete solution had occurred. Thereafter 30 kilograms of a 15 N solution of $NH_4OH$ (28% $NH_3$) was added over a 30 minute period during which time agitation was continued. A finely divided greyish-green flocculum formed in the solution and the stirring was continued until most of the ammoniacal odor of the $NH_4OH$ solution disappeared. There was thus formed a mixed slurry consisting of $Cu(OH)_2$, $Co(OH)_2$, $Cr(OH)_3$, $Zr(OH)_4$ dispersed in an aqueous solution of $NH_4NO_3$.

The resultant slurry was then transferred to an Ertel stainless steel filter press (Model No. 8 ESSC) equipped with No. 2 Ertel 8″ diameter filter discs and filtered at a pressure of 80 p.s.i. to remove the $NH_4NO_3$ solution. The filter cake was then dried to constant weight in a Genrich air circulating oven, Model 8842, at a temperature of 250° F. for 3 hours. The dried filter cake, consisting of a mixture of the dry hydroxides or hydrous oxides of the aforementioned metals, weighed 21.5 kilograms. The dried material consisted of a friable cake which was broken into fragments and ground in a Model 275 Hobart grinder, set to produce particles which passed through a No. 20 mesh U.S. standard screen. The resulting granules were tableted to form cylindrical tablets in a Colton Tablet Press (Model 321) fitted with 3/16″ diameter tungstun carbide punches and die. The press and quantity of the mixture were adjusted to give a tablet length of 3/16″. The tablets so produced would withstand an impact of 15.5 kg. without crushing or disintegrating.

The resulting tablets were placed in trays filled to a depth of ½ to ¾ inch and calcined in the aforementioned Genrich oven at a temperature of 1000° F. for 2 hours. At the end of this period tablets were removed from the oven. During the calcination the tablets had decreased in size from a respective diameter and length of 3/16″ to a respective diameter and length of 5/32″ respectively.

The tablets, which had a total weight of 11.96 kilograms and which were dark green in appearance, were tested for pore volume and specific surface area using the methods hereinbefore described. The tableted material was found to have a pore volume of 0.28 milliliter per gram and a specific surface area of 120 square meters per gram. A chemical analysis showed the tablets to consist of a physically or chemically bound inorganic complex of the oxides of copper, cobalt, chromium and zirconium having the following ratios:

$$CuO:3CoO:4Cr_2O_3:16ZrO_2$$

The tablets withstood an impact crushing test of 15.5 kilograms and were set aside and evaluated for catalytic activity as described hereinafter in Example V.

Example II

The process of Example I was repeated except that 10% powdered graphite was mixed with the mixture of metal hydroxides which has been dried at a temperature of 275° F. The resultant mixture was then moistened with a spray of 50% ethanol in water while being rotated in a circular pan which was tilted at an angle of 20 degrees during rotation. By so proceeding, the oxides were formed into spheres having a diameter of 7/32 inch. The spheres were calcined at 900° F. for 2½ hours. Upon analysis the spheres were found to be porous and to have shrunken to a diameter of between ⅛″ and 5/32″. Examination of the spheres showed then to have a pore volume of 0.36 milliliter per gram and a specific surface area of 140 square meters per gram. The spheres so produced withstood an impact crushing strength of 18.5 kilograms. The tablets were designated as Catalyst A, set aside for evaluation of catalytic activity as described hereinafter in Example VI.

Another catalyst having the same composition of metal oxides was prepared by a modification of the above described process of this Example II wherein the graphite was omitted and the filter cake containing the mixture of hydrous oxides was calcined directly to produce a solid mass or block of the catalyst. This block was broken into fragments which were ground to irregularly shaped granules having minimum and maximum dimensions within the range of from 1/16 to ¼ inch, were designated as Catalyst B, and set aside and evaluated for catalytic activity as described in Example VI.

Example III

The process of Example I was repeated except that a slurry consisting of 7.39 kilograms of a commercial $ZrO_2$ containing 10% of $HfO_2$ as an impurity and 29 liters of water were added to the stainless steel tank instead of the $Zr(NO_3)_4$ employed in Example I. The physical properties of the final tablets were substantially identical to those of the tablets of Example I and the metal oxide ratio of the inorganic complex was found to be approximately $$CuO:3CoO:4Cr_2O_3:11ZrO_2:1HfO_2$$

The tablets were set aside for evaluation of catalytic activity as described in Example VII below.

Example IV

To the stainless steel tank equipped as described in Example I was added, with agitation, 75 kilograms of water, 398 grams of CuO, 1124 grams of FeO, 3040 grams of $Cr_2O_3$ and 5393 grams of $HfO_2$. The size of the particles of the metal oxides ranged from 0.5 to 15 microns. The resultant slurry was agitated at high speeds for 1 hour and filtered and dried at 250° F. as in Example I. The material was then ground and mixed with 240 grams of graphite, tableted, and calcined as described in Example I.

The final tablets were of the same size as the tablets of Example I, had a pore volume of 0.15 milliliter per gram, a specific surface area of 80 square meters per gram and had metal oxides present in the following ratios:

$$CuO:3FeO:4Cr_2O_3:9HfO_2$$

The tablets were set aside for evaluation of catalytic activity as described in Example VIII below.

Example V

A cylindrical tube, 18 inches long and having a diameter of 2 inches was placed in the exhaust line in such a manner as to receive two cubic feet per minute of the hereinafter defined exhaust gases of a 4-cylinder gasoline engine which, when operated at a speed of 1800 revolutions per minute, produced an exhaust gas containing an amount of gaseous organic materials, including hydrocarbons and oxygenated organic compounds, which ranged from 0.15% to 0.4% by volume, and also contained from 2% to 3% carbon monoxide. The quantity of organic materials in the exhaust gas stream was measured by a Liston Becker, Model 15, non-dispersive infra-red analyzer sensitized with normal hexane. The carbon monoxide content of the exhaust gas streams was determined by Orsat analysis.

The forward nine-inch portion of the tube was surrounded by a nine-inch long electrical resistance heater, whereby the temperature of the exhaust gases could be controlled in the range of from 250° C. to 950° C. just prior to contacting such gases with the catalyst bed, which was located in the rearward nine-inch portion of the tube.

The forward portion of the tube also contained an air inlet into which controlled amounts of air could be pumped to provide an exhaust gas stream containing a range of from 4% to 34% by volume of air, the temperature of the resultant air-exhaust mixture being then controlled by the thermostatically controlled heater. The rearward nine-inch portion of the tube provided space for a 0.35 liter bed of the catalyst of Example I. A continuous measurement of a mixture of exhaust gases containing 20% by volume of air demonstrated that the amount of gaseous organic materials present was in the range of from 0.1% to 0.3% by volume and that the amount of carbon monoxide was present in the range of from 1% to 2%, by volume during the operation of the 4-cylinder engine. The gases were continuously analyzed using the method hereinbefore described.

The catalyst of Example I placed in the aforedescribed tube in the exhaust line as above described, was continuously contacted with such mixture of air and exhaust gases (maintained at a temperature of between 270° C. to 300° C.) of the 4-cylinder engine, until the catalyst became exhausted. When significant quantities of gaseous organic materials, e.g., 0.05% by volume, and carbon monoxide, e.g., 0.5% by volume, appeared in the exhaust gas which has been contacted with the catalyst, the experiment was discontinued.

The mixture of air and exhaust gases was continuously contacted with the catalyst bed for 200 hours or an equivalent of 8000 miles of automobile operation before the catalyst became "exhausted," i.e., the exhaust gases after contact with the catalyst, contained 0.05% by volume of organic gaseous materials and 0.5% by volume of carbon monoxide. Over the 200 hour operation period, the catalyst removed substantially all of the carbon monoxide and more than 90% of the above defined organic materials from the exhaust gases.

The exhaust gas was continuously generated at an hourly volume rate of 10,000 times the volume of the catalyst during the entire 200 hour period. The tablets when removed from the tube upon completion of the test were dimensionally unaltered, that is, they were of substantially the same size and had not crumbled or powdered. By way of contrast, when $Al_2O_3$ was substituted for $ZrO_2$ in the catalyst of Example I, the tablets pulverized after 50 hours and the catalyst no longer removed substantial quantities of organic materials and carbon monoxide from the exhaust gas stream.

*Example VI*

The procedure of Example V was repeated except that the catalyst of Example II, designated as Catalyst A, comprising spherically shaped pellets, was placed in the tube to form the catalyst bed in the exhaust line. The engine was operated for a period of 300 hours or an equivalent of 12,000 miles of automobile operation before the catalyst no longer removed a sufficient quantity of carbon monoxide and the aforementioned gaseous organic materials when contacted with the exhaust gases as above described. The spherically shaped pellets were intact and showed no evidence of disintegration. The granular catalyst, designated as Catalyst B, in Example II and prepared without the addition of graphite was evaluated and performed similarly to Catalyst A of Example II, was placed in the tube to form the catalyst bed in the exhaust line. The engine was operated for a period of 275 hours, equivalent to 11,000 miles of automobile operation, before the catalyst lost its activity as above described. Again the tablets showed no evidence of disintegration.

*Example VII*

The procedure of Example V was repeated except that the catalyst tablets of Example III were placed in the tube to form the catalyst bed in the exhaust line. After engine operation in excess of about 250 hours (250 hours are equivalent to about 10,000 miles of automobile operation) the catalyst showed no evidence of physical attrition or disintegration.

*Example VIII*

The procedure of Example V was repeated except that the catalyst tablets of Example IV prepared by mixing and tableting oxides of Cu, Fe, Cr and Hf were placed in the tube to form the catalyst bed in the exhaust line. The engine was then operated for a period of 250 hours, equivalent of 10,000 miles of automobile operation before the catalyst lost its activity as heretofore described. The catalyst showed no evidence of physical attrition or disintegration after 250 hours of operation.

*Example IX*

The catalyst of Example I was evaluated on a 1955 six-cylinder Chevrolet automobile driven under actual road conditions wherein the catalyst was placed in a modified commercial automobile muffler. Although the catalyst was still active the test was discontinued after 5000 miles. After this test the tablets showed no evidence of disintegration or physical attrition.

When a catalyst composed of tablets similar to those of Example I, except that the tablets contained $Al_2O_3$ instead of $ZrO_2$, was road tested, the tablets pulverized and built up such as engine back-pressure that the resultant powder catalyst was blown out of the muffler after 600 miles of driving. On the other hand, silica containing catalysts have been found to be ineffective in purifying exhaust gases.

*Example X*

One hundred gram samples of the catalyst pellets of Example I and the alumina-containing catalysts referred to in Example IX were alternately heated to 900° F. for 30 minutes and allowed to cool at room temperature. The procedure was repeated 4 times and the catalysts were placed in separate cylindrical containers and tumbled for 30 minutes. At the end of this period one-half of the alumina containing pellets had disintegrated into fine particles and powder whereas the catalyst pellets of Example I remained substantially intact and no pellet disintegration was observed.

What is claimed is:

1. A method of effecting the oxidation of the oxidizable constituents of the exhaust gases of an internal combustion engine which comprises contacting a mixture of said exhaust gases and air with a catalyst at a temperature in the range of from 250° C. to 950° C., said catalyst consisting essentially of a catalytically active mixture of metal oxides in the following proportions:

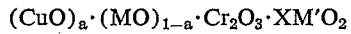

$$(CuO)_a \cdot (MO)_{1-a} \cdot Cr_2O_3 \cdot XM'O_2$$

wherein M is selected from the group consisting of cobalt and iron, M' is a tetravalent transitional metal selected from the group consisting of zirconium, hafnium and mixtures thereof, $a$ is a fractional number of from 0.1 to 0.9 and X is a number of from 1 to 8.

2. The method of claim 1, wherein said catalyst is characterized by having a pore volume of from about 0.1 to about 0.4 milliliters per gram and a specific surface area of from about 40 to about 200 square meters per gram.

3. The method of claim 2, wherein said air is from about 4% to about 34% by volume of said mixture.

4. A method of effecting the oxidation of the oxidizable constituents of the exhaust gases of an internal combustion engine which comprises contacting a mixture of said exhaust gases and air with a catalyst at a temperature in the range of from 250° C. to 950° C., said catalyst comprising granules of an amorphous, catalytically active inorganic complex having the formula:

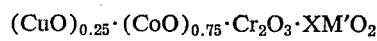

$$(CuO)_{0.25} \cdot (CoO)_{0.75} \cdot Cr_2O_3 \cdot XM'O_2$$

where M' is a mixture of zirconium and hafnium having a Zr:Hf ratio of from 10:1 to 12:1 and X is a number of from 2 to 6.

5. The method of claim 4, wherein said catalyst is further characterized in having a pore volume of from about 0.2 to about 0.4 milliliters per gram and a specific surface area of from about 50 to about 120 square meters per gram.

6. The method of claim 5, wherein said air is from about 4% to about 34% by volume of said mixture.

7. A method of effecting the oxidation of the oxidizable constituents of the exhaust gases of an internal combustion engine which comprises contacting a mixture of said exhaust gases together with air, with a catalyst at a temperature in the range of from 250° C. to 950° C., said catalyst comprising granules of an amorphous catalytically active inorganic complex having the formula:

$$(CuO)_{0.25} \cdot (FeO)_{0.75} \cdot Cr_2O_3 \cdot XM'O_2$$

wherein M' is a mixture of zirconium and hafnium having a Zr:Hf ratio of from 10:1 to 12:1 and X is a number of from 2 to 6.

8. The method of claim 7, wherein said catalyst is further characterized in having a pore volume of from about 0.1 to about 0.4 milliliters per gram and a specific surface area of from about 40 to about 200 square meters per gram.

9. The method of claim 8, wherein said air is from about 4% to about 34% by volume of said mixture.

References Cited by the Examiner
UNITED STATES PATENTS

| | | | |
|---|---|---|---|
| 2,071,119 | 2/1937 | Harger | 23—2 X |
| 3,024,593 | 3/1962 | Houdry | 23—2 X |

BENJAMIN HENKIN, *Primary Examiner.*

MAURICE A. BRINDISI, *Examiner.*